Patented Aug. 25, 1931

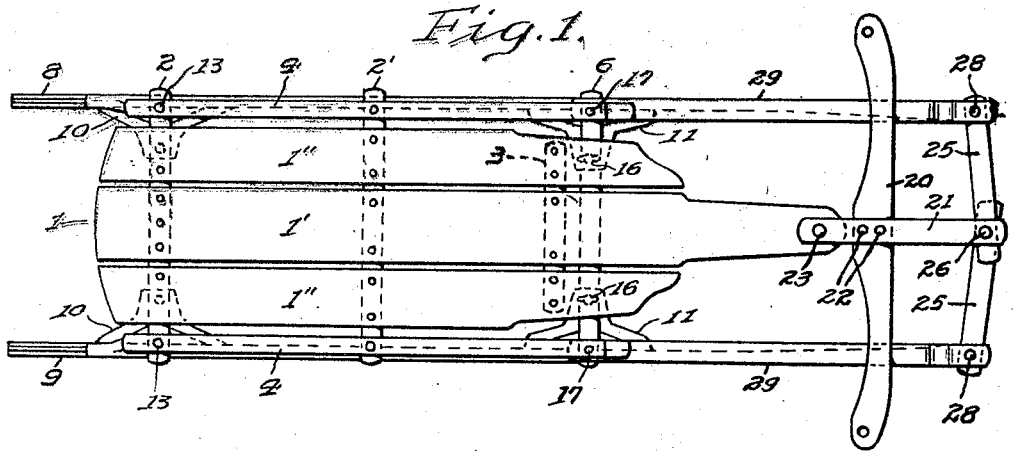
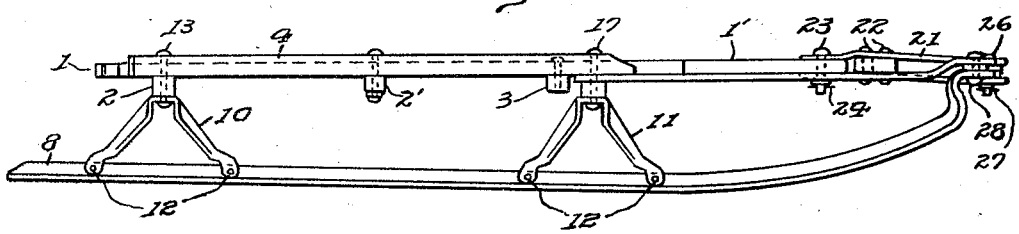
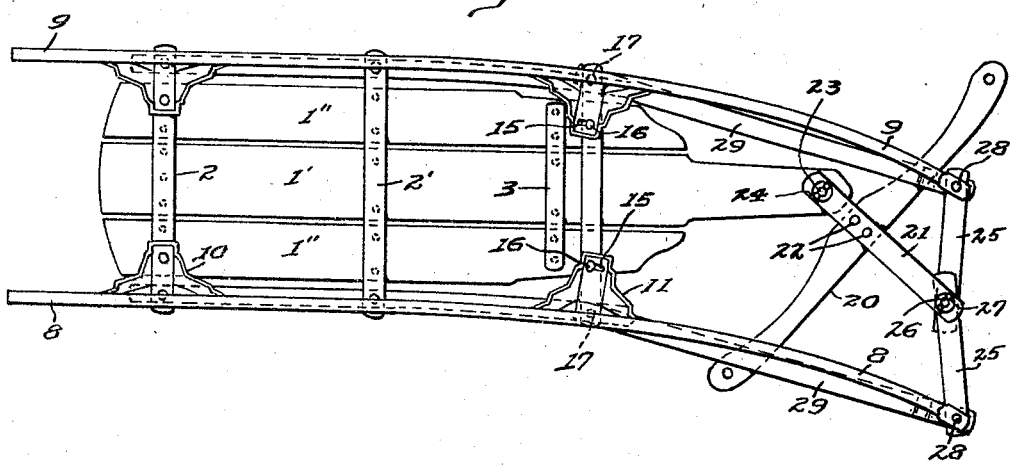

1,820,044

UNITED STATES PATENT OFFICE

JAMES MONROE BOWEN, OF CAPE MAY COURT HOUSE, NEW JERSEY, ASSIGNOR TO S. L. ALLEN & CO., INC., OF PHILADELPHIA, PENNSYLVANIA, A CORPORATION OF PENNSYLVANIA

SLED

Application filed February 17, 1930. Serial No. 428,867.

My invention relates to sleds of the type which are steered by bending the runners laterally, and is directed toward the improvement of the steering qualities of such sleds by decreasing the amount of effort which it is necessary to exert to steer the sled and by increasing the extent to which and speed with which the runners may be deflected laterally, whereby the sled may be turned in either direction more easily, quickly and to a greater angle than has heretofore been possible with sleds of the general type to which my invention relates.

Further objects of the invention are to provide a steering sled having the foregoing characteristics yet which may be manufactured at a cost to permit it to compete with the steering sleds now on the market and in commercial demand; to generally improve the design and construction of steering sleds in certain respects yet without decreasing the strength or increasing the complication thereof, whereby a sled constructed in accordance with and embodying the advantages of my invention is fully as serviceable and no more likely to get out of order or become damaged under conditions of use to which sleds are necessarily subjected than other steering sleds having laterally bendable runners.

Still further objects and novel features of design, construction and arrangement comprehended by my invention are hereinafter more fully disclosed or will be apparent from the following description of a sled constructed in accordance with one embodiment thereof and illustrated in the accompanying drawings.

In the said drawings, Fig. 1 is a top plan view of the sled with the runners in normal or unflexed position; Fig. 2 is a side elevation thereof and Fig. 3 is a bottom plan view of the sled shown in the preceding figures but with the runners flexed substantially to their maximum extent, thus showing the parts in the position in which they would appear when the sled is being turned sharply to the left. The same numerals are used to designate the same parts in the several figures.

As shown, the sled comprises a top or deck generally designated as 1 and formed of a longitudinally extending center strip or slat 1' and outer strips 1" disposed on either side thereof, the center strip being considerably longer than the side strips and extending forwardly beyond the front ends of the latter. The strips are held together by transversely extending benches 2, 2' and a cleat 3 to which the strips are nailed or otherwise suitably secured. The benches 2, 2', respectively disposed near the rear end of the deck and at about the middle thereof, are of sufficient length to extend beyond the side edges of the deck to form supports for the side rails 4, 4 which extend parallel to the deck and are rigidly secured to the benches. The cleat 3 is desirably made somewhat shorter than the benches and only serves to tie the slats together adjacent their forward ends. Vertical support is, however, afforded to the forward end of the deck by another bench 6 extending transversely of the sled beneath the deck but unsecured thereto, the deck merely resting on this bench and the parts being thus relatively slidable.

For holding the deck in properly spaced relation to the runners 8, 9 and connecting the parts together, suitable supports 10, 11 are employed; while these supports may be of any desired character, I ordinarily prefer to use supports formed from sheet metal substantially like those disclosed in Patent 1,066,173 granted to Samuel L. Allen July 1, 1913, and which comprise downwardly diverging legs and a flat top portion which forms a suitable seat for the superjacent bench. When using such supports, one pair 10 thereof may be disposed beneath the rear bench 2 and riveted or otherwise secured to the runners as by rivets 12 and also to the bench as by rivets 13, while another pair 11 may be similarly disposed beneath the bench 6 and riveted to the runners by rivets 12. However, as it is desirable that these supports 11 be capable of a small oscillatory movement with respect to the bench, I prefer to arrange for the same by providing the flat top portions of the supports with slots 15 for the passage of the innermost of the pair of rivets or bolts 16, 17 by which each of the said supports is secured to the cross bench 6, as most clearly shown in Fig. 3. Thus, when the runners are flexed as hereinafter described, the outermost bolt 17 acts as a pivot about which the adjacent support is free to turn through a limited arc.

The several parts to which reference has heretofore been made are of the general character of those embodied in certain types of steering sleds at present in use and thus require no further or more extended description.

Reference will now be made more particularly to the mechanism directly concerned with the steering of the sled and to which the improvements of the present invention especially relate. This mechanism comprises the usual handle bar 20 disposed in advance of the front end of the center slat 1' so as to normally extend transversely of the sled substantially in the plane of the top thereof. This handle bar which is of sufficient length to project beyond the runners on either side of the sled, to enable the operator to push on one end or the other thereof with his hands or feet depending on his position on the sled, is fixedly secured to a steering bar 21 as by rivets 22, this bar normally extends parallel to and coincident with the center line of the sled, and, while it may be of any preferred construction, is desirably formed of two vertically spaced strips of flat steel respectively disposed above and below the handle bar. At its rear end the steering bar is pivoted to the adjacent end of the slat 1' by a pivot bolt 23 extending vertically through both parts of the steering bar which respectively lie above and below the slat and secured in position in any convenient way, as by a cotter pin 24 adjacent its lower end. At its forward or opposite end the steering bar is pivotally connected to two oppositely inwardly extending links 25 by a pivot bolt 26 held in place by a cotter pin 27 or in any other convenient way, the steering handle 20 being preferably positioned more nearly adjacent the pivot 23 than the pivot 26, as clearly shown in Fig. 1. As stated, the links 25 respectively extend oppositely inward from the adjacent ends of the runners 8, 9 which are upwardly and forwardly curved in the usual way and then turned over and flattened in the horizontal plane so as to form seats for the adjacent ends of the links which are respectively secured thereto by suitable pivots 28, the links being preferably so disposed that when the parts are in normal position as shown in Fig. 1, they respectively project slightly angularly forward whereby the pivot bolt 26 lies somewhat in advance of a line connecting the pivots 28. Extending rearwardly from each of these pivots to the bolt 17 which is on the same side of the sled is a side bar 29 which normally lies above and substantially parallel to the subjacent runner and is pivoted at its ends respectively on the bolt 17 and pivot 28. The side bars, as well as the links 25, are preferably made of flat steel, and these several parts are of course relatively movable with respect to each other and with respect to the steering bar 21 by reason of their pivotal interconnection. Preferably, the rear ends of the side bars are disposed beneath the adjacent ends of the side rails and the upper face of the bench, as best shown in Fig. 2, and the front ends of the bars bent upward and then forward sufficiently to slightly overlie the links 25, the pivots 28 being desirably in the form of rivets extending through the side bars, links and ends of the runners and headed over at both ends so as to securely retain the parts in assembled position, while the two parts of the steering bar respectively lie above and below the overlapping inner ends of the links.

It is believed it will be readily apparent from an inspection of the drawings in the light of the foregoing description that a sled constructed substantially as described may be steered in either direction as desired by pushing on one end or the other of the steering handle 20 so as to correspondingly turn the steering arm in one direction or the other about the pivot 23 with resulting flexure or bending of the runners to the right or left as the case may be, the side bars 29 during this movement turning about the pivots 17 and the supports 11 also slightly turning about them as best shown in Fig. 3. As the handle bar 20 is turned more and more from normal position during the steering operation, the pivot 26 is progressively moved toward the rear of the sled so that the links 25 are finally brought into line and then, as the turning movement of the steering arm is continued, are gradually brought into opposite angular inclination with respect to the line connecting the pivots 28 until they finally assume a position substantially as indicated in Fig. 3, which marks about the extent to which the runners, which are made of tempered or spring steel or other suitable material, can be flexed without exceeding their elastic limit and thus imparting to them a permanent bend or set. Of course, until this point is exceeded, the runners immediately tend to return to normal position as soon as the pressure on the steering handle is released, so that immediately following the release of that pressure the sled automatically tends to return to a straight course from which it can again be deflected in one direction or the other by suitable pressure on the steering handle.

In sleds of the general character of those to which my invention relates the runners are ordinarily constructed so as to "toe in" slightly toward the front, and I prefer to arrange them in this manner in a sled embodying my invention, but whether this arrangement be adopted or not, it is to be noted that when the parts are constructed and assembled substantially as described, the normal distance between the pivots 28 and the adjacent ends of the runners is somewhat decreased when the runners are fully flexed, and further that through the combined interaction of the links, steering arm and other interconnected parts, that runner lying on the side toward which the sled is being steered is flexed somewhat less than the opposite runner.

In the practical operation of sleds constructed in accordance with my invention, it has been found that much less pressure on the steering handle is required to turn the sled through a given angle than in sleds constructed in the manner heretofore generally employed and thus embodying a rigid bar or the like extending between the forward ends of the runners, while, on the other hand, I am enabled in accordance with my invention to secure a much greater flexure of the runners than in the constructions heretofore employed. In consequence, much less effort is required to steer a sled embodying my invention, and it is possible to make much sharper and quicker turns therewith with resulting enhancement of the pleasure derived from its use and decrease in the liability of accident than has heretofore been possible with the older types, yet without in any way reducing the speed of the sled under like operating conditions.

While I have herein illustrated and described with considerable particularity a sled constructed in accordance with a preferred embodiment of my invention, I do not thereby desire or intend to limit myself to any specific features of design, construction or arrangement of the various parts, as changes and modifications may be made therein as desired without departing from the spirit and scope of the invention as defined in the appended claims.

Having thus described my invention, I claim and desire to protect by Letters Patent of the United States:

1. A steering sled having laterally bendable runners, a deck disposed therebetween, supports carried by the runners, cross benches carried by said supports and affording vertical support to the deck, a side bar extending adjacent each runner and pivotally connected at its extremities to one of the cross benches and to the forward end of the runner, a steering bar pivotally connected at one end to the deck and extending forwardly therefrom, and a pair of links respectively extending inwardly from the forward ends of the runners and lying in angular relation to each other when the runners are unflexed, each link being pivoted to the adjacent runner at its outer extremity and to the steering bar at its inner.

2. A steering sled having laterally bendable runners, a deck disposed therebetween, supports carried by the runners, cross benches carried by said supports and affording vertical support to the deck, a side bar extending adjacent each runner and pivotally connected at its extremities to one of the cross benches and to the forward end of the runner, a steering bar pivotally connected at one end to the deck and extending forwardly therefrom, and a pair of links extending oppositely inward from the front ends of the runners and respectively pivotally connected thereto at their outer extremities and to the steering bar at their inner extremities, the point of pivotal connection between the steering bar and the links being disposed in advance of a line connecting the points of pivotal connection of the links and the runners when the runners are unflexed.

In witness whereof, I have hereunto set my hand this 14th day of February, 1930.

JAMES MONROE BOWEN.